United States Patent [19]
Dean

[11] Patent Number: 5,635,681
[45] Date of Patent: Jun. 3, 1997

[54] SYSTEM FOR WEIGHING RADIOACTIVE MATERIALS

[75] Inventor: Ellis M. Dean, Cumbria, United Kingdom

[73] Assignee: British Nuclear Fuels PLC, Cheshire, United Kingdom

[21] Appl. No.: 208,453

[22] Filed: Mar. 10, 1994

[30]  Foreign Application Priority Data

Mar. 11, 1993 [GB] United Kingdom ............ 9304965

[51] Int. Cl.$^6$ .................................................. G01G 5/04
[52] U.S. Cl. ........................................ 177/208; 177/254
[58] Field of Search ........................... 177/208, 209, 177/254, 729.1, 25.11, 25.12, 25.13, 25.14; 73/824, 862.382, 862.581, 862.584

[56]  References Cited

U.S. PATENT DOCUMENTS

| | | | |
|---|---|---|---|
| 2,403,204 | 7/1946 | Feld | 177/208 |
| 2,430,702 | 11/1947 | Bohannan | 177/208 |
| 2,516,545 | 7/1950 | Brewster | 177/208 |
| 2,592,009 | 4/1952 | Clement et al. | 73/824 |
| 2,867,121 | 1/1959 | Rosa | 73/862.382 |
| 2,954,221 | 9/1960 | Ernst | 73/862.382 |
| 4,228,864 | 10/1980 | Berger et al. | 177/145 |
| 4,366,876 | 1/1983 | Chen | 177/209 X |
| 4,836,308 | 6/1989 | Davis et al. | 177/25.14 |

FOREIGN PATENT DOCUMENTS

| | | |
|---|---|---|
| 1494495 | 12/1977 | United Kingdom . |
| 2021791 | 12/1979 | United Kingdom . |
| 2105470 | 3/1983 | United Kingdom . |

*Primary Examiner*—Michael L. Gellner
*Assistant Examiner*—Randy W. Gibson
*Attorney, Agent, or Firm*—Nixon & Vanderhye P.C.

[57]  ABSTRACT

A weighing system for obtaining the mass of objects, particularly spent nuclear fuel rods, includes a weighing device having a weighing platform on which objects to be weighed are placed. The platform rests on three hydraulic load cells, each communicating with an associated pressure transducer. Electrical signals from the transducers representing the pressure in the load cells and, consequently, the mass of the objects, are converted into digital form by a convertor and then processed by a computer to calculate the required mass values. The weighing device is located within a radioactive environment existing in a shielded enclosure, the transducer and the signal processing means being situated outside the enclosure and remote from the radioactive environment.

7 Claims, 4 Drawing Sheets

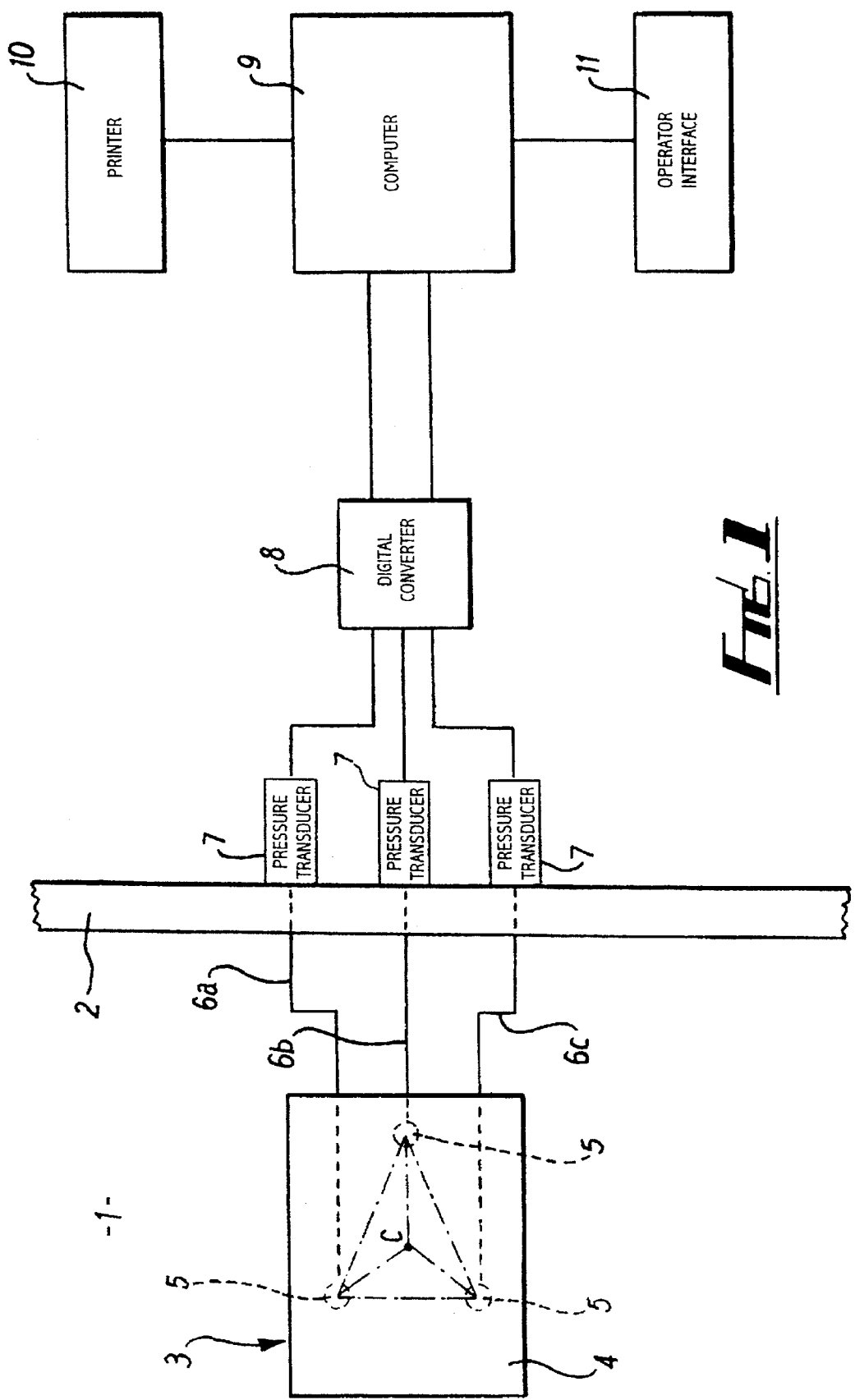

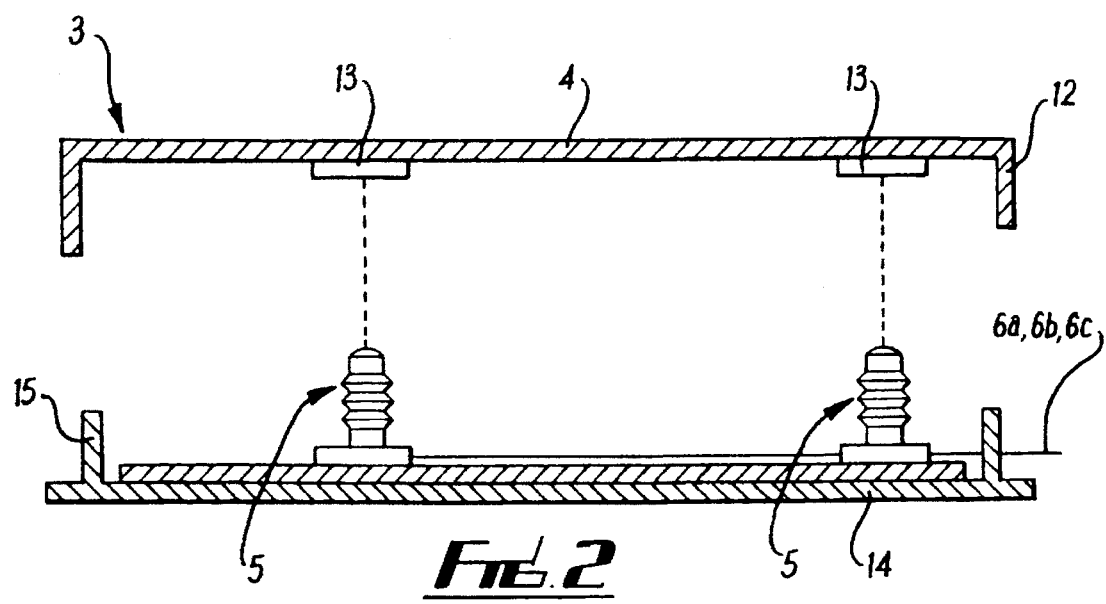
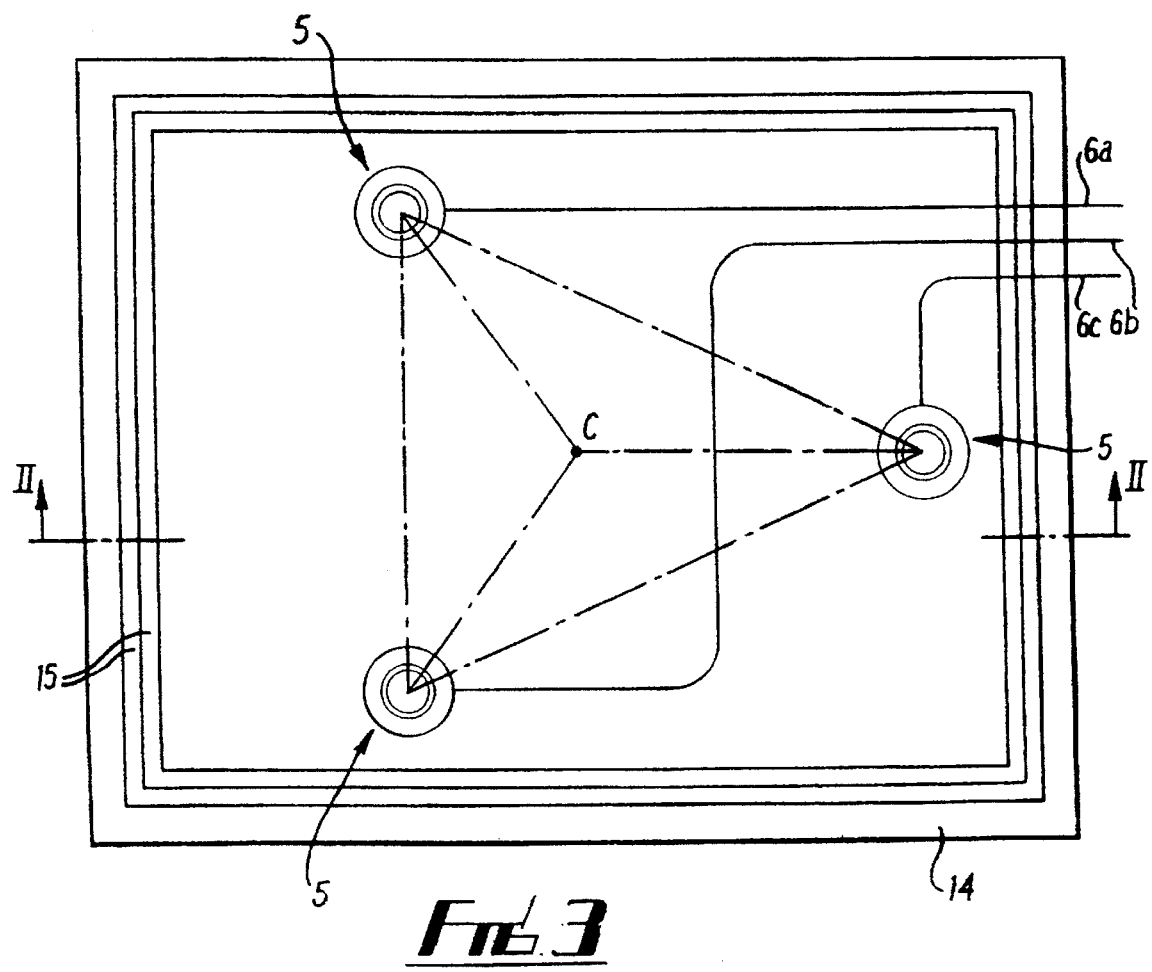

SYSTEM FOR WEIGHING RADIOACTIVE MATERIALS

BACKGROUND OF THE INVENTION

1. Field of the Invention

This invention relates to weighing system. More particularly, the invention relates to a weighing system for obtaining the mass of radioactive objects, such as spent nuclear fuel rods.

2. Description of Prior Art

In the reprocessing of spent nuclear fuel it is important for inventory and accounting purposes that the amount of spent fuel to be reprocessed is calculated accurately. One method of obtaining this amount is to weigh the fuel rods. Because of the radiation emitted by the spent fuel rods, weighing has to be carried out by a weighing device located in a shielded cave so as to protect the operating personnel from the dangers of radiation exposure. Maintenance of the weighing device is difficult because of its inaccessibility. Therefore it is essential that the weighing device is robust and reliable so as to reduce the maintenance requirements to a minimum.

One known type of weighing device for obtaining the mass of spent fuel rods employs solid state load cells. Although such a device produces accurate results it has not proved satisfactory because the load cells are unable to withstand the mechanical shock loads and the high radiation fields existing in the cave and so tend to fail after a short period of time.

It is desirable therefore that the maintenance requirements of weighing systems for radioactive items are kept to a minimum and that the equipment employed by the system is resistant to the harmful effects of radiation.

SUMMARY OF THE INVENTION

According to the present invention there is provided a weighing system for obtaining the mass of objects, the system comprising a weighing platform on which an object to be weighed is placed, a plurality of hydraulic load cells for supporting said platform, each of said load cells containing a liquid in which a pressure is generated when an object is placed on the platform, said pressure having a value which corresponds to the mass of said object, the weighing system further including a plurality of pressure transducers, each of which is actuated by the pressure of the liquid from an associated load cell so as to emit an electrical signal having a current corresponding in value to the liquid pressure value, and signal processing means for processing said electrical signal to obtain a value for the mass of the object placed on the platform.

Preferably there are three hydraulic load cells for supporting the weighing platform, each load cell being located at one apex of a triangle formed by imaginary lines connecting the three load cells, wherein the centroid of said triangle is coincident with the centre of the gravity of the platform.

In a preferred construction, each load cell includes a compressible bellows member having a closed upper end on which the platform rests, wherein a downward force exerted by the platform on the load cell causes compression of the bellows member, thereby generating a pressure in the liquid contained in the load cell.

Each load cell preferably includes an insert extending through the inside of the bellows member, the insert having an upper surface spaced from the closed upper end of the bellows member wherein the upper surface of the insert serves to restrict the compressive movement of the bellows member.

Preferably the liquid contained in the load cells is water.

Each electrical signal produced by the pressure transducers provides an input to an analogue to digital converter, the digital signal produced by the converter being transmitted to the signal processing means.

BRIEF DESCRIPTION OF THE DRAWINGS

Embodiments of the invention will now be described, by way of example, with reference to the accompanying drawings, in which:

FIG. 1 is a schematic diagram of a weighing system according to a preferred embodiment of the invention.

FIG. 2 is a sectional elevation of a weighing device along the plane II—II.

FIG. 3 is a plan view of the weighing device with the weighing platform removed.

DETAILED DESCRIPTION OF PREFERRED EMBODIMENTS

Figure 4:
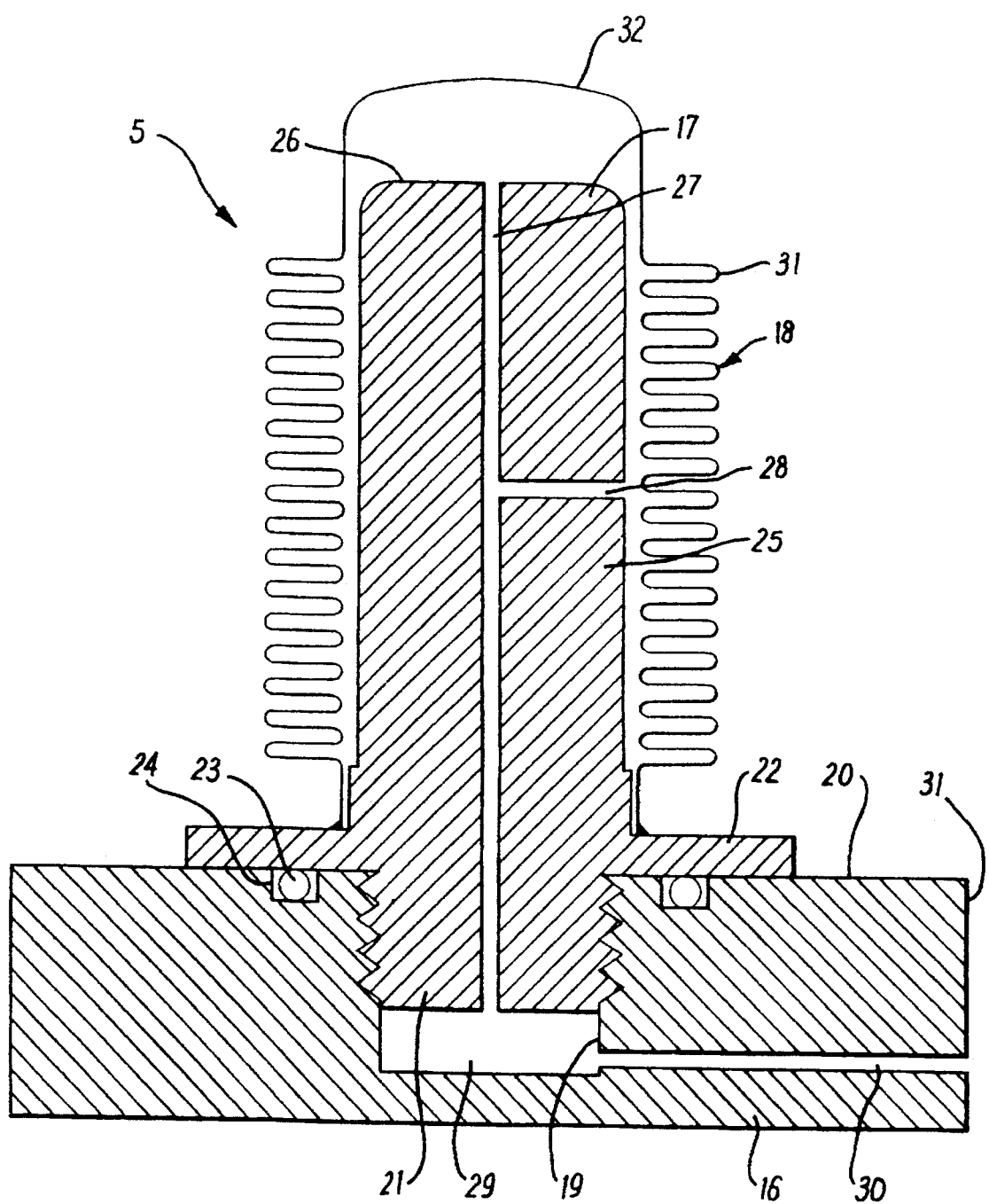
FIG. 4 is a cross sectional view of a hydraulic load cell assembly.

In a preferred application of the invention, the weighing system is used to obtain the mass of spent nuclear fuel rods which are about to be despatched for reprocessing. Records obtained from the weighing system are used for fuel material inventory and accountancy purposes.

Referring to FIG. 1, numeral 1 represents a fuel element decanning cave in which the metal cladding is stripped from a fuel element to provide a fuel rod for delivery to subsequent spent fuel reprocessing operations. Because of the radioactive environment existing within the cave, it is surrounded by a radiation shielding wall 2. Within the cave 1 is a hydraulic weighing device 3, which is shown in more detail in FIGS. 2, 3 and 4. The weighing device 3 includes a stainless steel weighing platform 4 on which spent fuel rods to be weighed are placed.

The platform 4 is supported on three hydraulic load cells 5, each of which contains a liquid, preferably distilled water. Each load cell 5 communicates through an associated flexible hydraulic hose 6a, 6b, 6c with a pressure transducer 7 mounted on the external surface of the shielding wall.

In use, fuel rods placed on the weighing platform 4 generate a static pressure in the liquid contained in the load cells 5, this pressure being communicated to the pressure transducers 7 through the hoses 6a, 6b, 6c. The pressure transducers 7, which are preferably of the semiconductor type, serve to convert the liquid pressure into an electrical current having a value related to the value of the liquid pressure. Preferably, the transducers are designed to convert a pressure range of 0–100 psi to a current range of 4–20 mA.

The pressure transducers 7 are connected to an analogue to digital converter 8 which serves to convert the analogue current signals from each of the three pressure transducers 7 into a 12-bit digital form. This digital signal is transmitted to a computer 9 which processes the signal and instructs a printer 10 to produce a record of the mass of fuel rods on the platform 4. The weighing system is controlled by an operator in response to prompts displayed on an operator interface unit 11. A suitable interface unit has a 40 character alphanumeric display and two push buttons, one encoded to transmit 'N' and the other is encoded to transmit 'Y'. If desired, the weighing system can be operated without the interface unit by means of the computer keyboard.

As seen in FIGS. 2 and 3, the hydraulic weighing device comprises a stainless steel weighing platform 4 having downwardly depending peripheral side walls 12. Three pads 13 are welded to the underside of the weighing platform 4 at locations corresponding to the positions of the load cells 5. The weighing device 4 has a baseplate 14 which is provided around its periphery with upstanding side walls 15. FIG. 2 shows the weighing platform 4 in a raised position, but, in use, the platform 4 rests on the three load cells 5 with the side walls 11 surrounding the side walls 15 of the baseplate 14. Each lead cell 5 communicates with a pressure transducer 7 by means of a separate hydraulic hose 6a, 6b, 6c. The three lead cells 5 are arranged in the form of a triangle so as to help in spreading the lead of the spent fuel pins on the platform 4 equally between the cells. Each load cell is located at the apex of a triangle which is formed by imaginary lines, indicated by chain-dot lines in FIG. 3, connecting the three cells. The centroid C of this triangle coincides with the centre of gravity of the weighing platform 4.

Referring to FIG. 4, each load cell 5 comprises a base 16, an insert 17 and a bellows member 18, all of which are made of stainless steel. A central blind bore 19 extends downwardly from an upper surface 20 of the base 16. An upper region of the bore 19 is provided with a screw thread for receiving a correspondingly screw-threaded spigot 21 formed on the insert 17. A flange 22 extends laterally from the insert 17 and retains an O-ring seal 23 within a groove 24 formed in the upper surface 20 of the base 16. The insert 17 has an upstanding cylindrical post 25 which is provided with a flat upper surface 26. A central passage 27 and a passage 28 branching laterally from the central passage are formed in the post 25. At its lower end the passage 27 communicates with a chamber 29 formed below the spigot 21. An outlet passage 30 extends from the chamber 29 to a peripheral surface 31 of the base 16 where it is connected to one of the hoses 6a, 6b, 6c.

The bellows member 18 is of a generally cylindrical shape and has a side wall provided with corrugations 31, and a domed, closed upper end 32. The lower open end of the bellows member 18 is welded to the insert flange 22 The upper surface 26 of the insert post 25 serves to restrict excessive compressive movement of the bellows member 18. Preferably there is a gap of about 5 mm between the upper surface 26 and the domed end 32 of the bellows member 18. Excessive transverse movement of the bellows member 18 is prevented by the insert 17 and there is a gap of about 1 mm between the side of the post 25 and the corrugated side wall of the bellows member 18.

The interior of the bellows member 18, the passages 27, 28, 30, the chamber 29 and the hoses 6a, 6b, 6c are filled with distilled water to form three separate, closed hydraulic circuits. Thus, in use, the pressure exerted by the weighing platform 4 on the load cells 5 causes compression of the bellows members 18. This generates a static pressure in the distilled water which is proportional to the mass of fuel rods placed on the weighing platform 4. As previously described, this pressure is translated into electrical currents of a value related to the water pressure by the pressure transducers 7. These electrical currents are subsequently converted into a 12-bit digital signal by the analogue to digital converter 8 for processing by the computer 9.

The weighing system can be used in a so-called tray mode, in which a batch of fuel rods is weighed, or in a so-called single rod mode, in which fuel rods are weighed one at a time. To operate the system in the tray mode, a tray holding several fuel rods is placed on the weighing platform 4 and reading is taken. A fuel rod is then removed from the tray, placed in a transport flask for conveyance to the reprocessing plant, and another reading is taken. The difference between the two readings gives the mass of the removed fuel rod, taking into account a previously calculated calibration factor. This procedure is continued until all of the fuel rods have been accounted for and indicated the computer.

To operate the system in the single rod mode, the operator must first set the system so as to obtain a zero reading. A fuel rod is then placed on the weighing platform 4 and a button on the interface unit 11 is pressed to initiate the weighing process. For both modes of operation, the calculated mass is automatically logged on to the printer 10 which records the time and date for each reading.

After installation of the weighing system, it is necessary to evacuate the load cells and their hydraulic hoses before filling them with distilled water. The evacuation and filling procedure is carried out with the weighing platform 4 removed from the weighing device 3 so as to allow freedom of movement for the bellows member 18.

Figure 5:
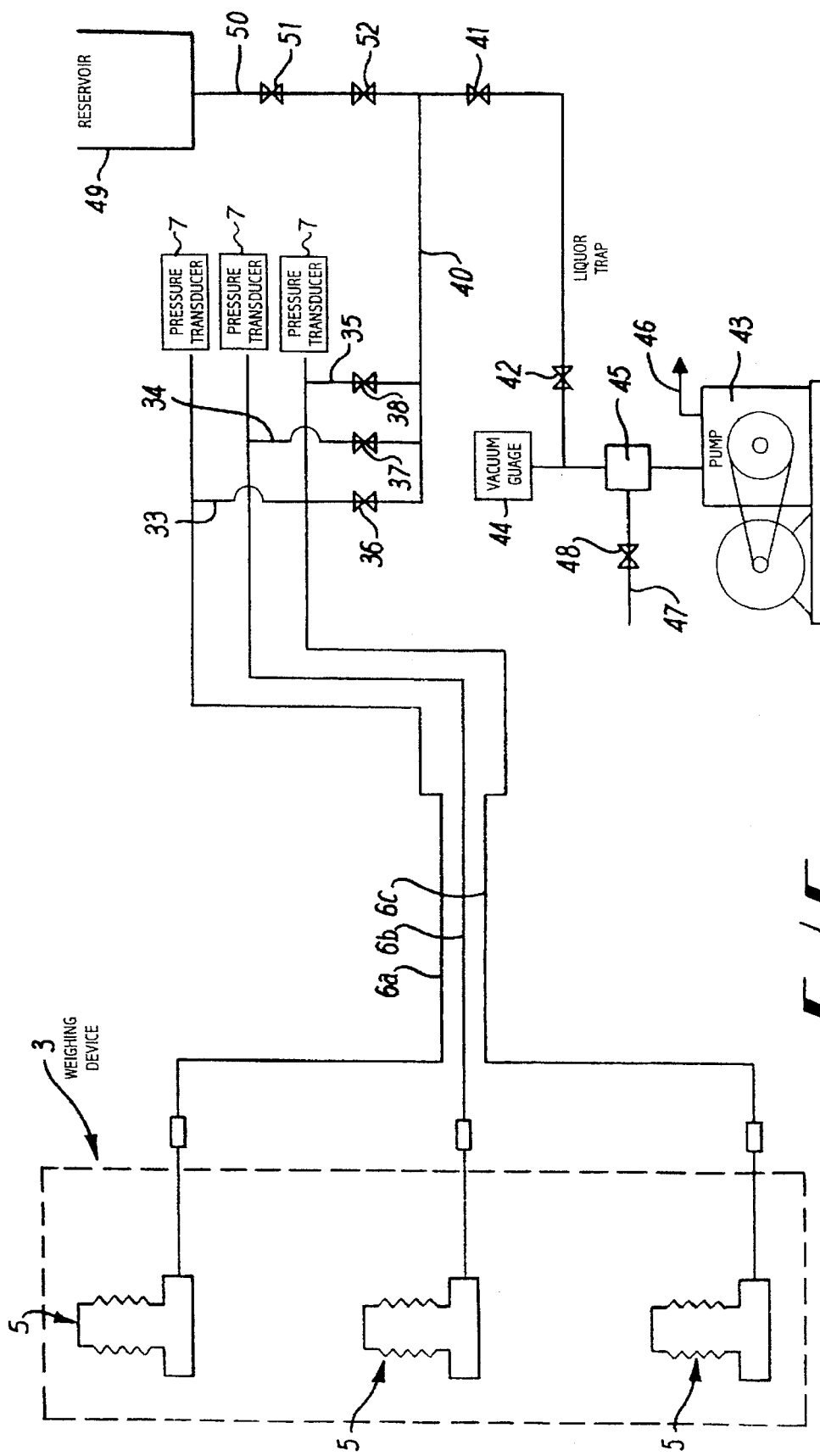
FIG. 5 is a schematic diagram of a system for evacuating and filling the hydraulic load cells and the associated hoses.

Referring to the evacuating and filling system illustrated in FIG. 5, venting and filling pipes 33, 34, 35 are connected to, respectively, hoses 6a, 6b, 6c at a point upstream of the pressure transducers 7. Each of these pipes has a valve 36, 37, 38 and each pipe is connected to a common pipe 40 which leads through further valves 41, 42 to a vacuum pump 43. The pump 43 is equipped with a vacuum gauge 44, a liquor trap 45 and is exhausted through line 46. A vent pipe 47, provided with a valve 48, leads from the liquor trap 45. The system includes a reservoir 49 for containing distilled water and has an outlet pipe 50 equipped with valves 51 and 52.

Each load cell and hose system is evacuated separately. To evacuate hose 6a and the associated load cell 5, valves 37, 38, 48 and 51 are closed. The vacuum pump 43 is operated for a period of time until the reading on the vacuum gauge indicates the desired vacuum. Typically, a reading of 3.17 kPa will indicate that the hose 6a and load cell 5 are sufficiently empty. Valves 41 and 42 are then closed and the vacuum pump 43 is switched off and vented through pipe 47 by opening the valve 48. This procedure is repeated for hose 6b, but with valve 37 open and valves 36 and 38 closed, and for hose 6c with valve 38 open and valves 36 and 37 closed.

Each load cell and hose system is also separately filled with distilled water from the reservoir 49. To fill the hose 6a and the associated load cell 5, valve 36 is open and valves 37 and 38 reclosed. After closing valve 52, valve 51 is opened allow any trapped air to escape into the reservoir 49. The valve 52 is then opened to allow distilled water to flow into the load cell 5 and hole 6a. Finally, valve 36 is closed to retain the water in the hydraulic system. This procedure is repeated for hoses 6b and 6c, using the liquor trap 45 to contain any residual water in the system.

Because of the lack of moving parts, the weighing system has a long service life and will require very little servicing or maintenance. This is extremely important because of the inaccessibility of the weighing device within the radioactively contaminated cave. Since the components of the weighing device are made from stainless steel and the hydraulic medium is distilled water, some resistance to radiation damage is provided.

I claim:

1. A weighing system for obtaining the mass of radioactive objects, the system comprising:
   an enclosure surrounded by radiation shielded walls;

a weighing platform, located in said enclosure, on which a radioactive object to be weighed is placed;

a plurality of hydraulic load cells, located in said enclosure, for supporting said platform, each of said load cells containing a liquid in which a pressure is created when an object is placed on the platform, said pressure having a value which corresponds to the mass of said object, a plurality of pressure transducers, located outside the enclosure, each transducer actuated by the pressure of the liquid from an associated load cell so as to emit an electrical signal having a current corresponding in value to the liquid pressure value, and signal processing means for processing said electrical signal to obtain a value for the mass of the object placed on the platform, each load cell communicating with a respective one of the pressure transducers located outside the enclosure.

2. A weighing system according to claim 1, wherein there are three hydraulic load cells, each load cell being located at one apex of a triangle formed by imaginary lines connecting the three load cells, wherein the centroid of said triangle is coincident with the centre of gravity of the platform.

3. A weighing system according to claim 1, wherein each load cell includes a compressible bellows member having a closed upper end on which the platform rests, wherein a downward force exerted by the platform on the load cell causes compression of the bellows member, thereby generating a pressure in the liquid contained in the load cell.

4. A weighing system according to claim 3, wherein each load cell includes an insert extending through the inside of the bellows member, wherein the upper surface of the insert serves to restrict the compressive movement of the bellows member.

5. A weighing system according to claim 1, in which the objects to be weighed are spent nuclear fuel rods.

6. A weighing system according claim 1, in which the liquid contained in the load is water.

7. A weighing system for obtaining the mass of radioactive objects, the system comprising:

an enclosure surrounded by radiation shielding walls;

a weighing platform, at least partially located within said enclosure, on which an object to be weighed is placed;

at least one hydraulic load cell, at least partially located within said enclosure, for supporting said platform, said at least one hydraulic load cell containing a liquid in which a pressure is created when an object is placed on the platform, said pressure having a value which corresponds to the mass of said object, at least one pressure transducer, located outside the enclosure and responsive to the pressure of the liquid from said at least one load cell, so as to emit an electrical signal having a current corresponding in value to the liquid pressure value, and a signal processor, located outside said enclosure and responsive to said electrical signal, to indicate a value for the mass of the object placed on the platform.

* * * * *